(12) United States Patent
Tanaka et al.

(10) Patent No.: US 12,445,371 B2
(45) Date of Patent: Oct. 14, 2025

(54) COMMUNICATION PATH FINDING DEVICE, COMMUNICATION PATH FINDING METHOD, AND PROGRAM

(71) Applicant: NTT, Inc., Tokyo (JP)

(72) Inventors: Takafumi Tanaka, Musashino (JP);
Takuya Ohara, Musashino (JP);
Fumikazu Inuzuka, Musashino (JP);
Takuya Oda, Musashino (JP);
Masayuki Shimoda, Musashino (JP)

(73) Assignee: NTT, Inc., Tokyo (JP)

( * ) Notice: Subject to any disclaimer, the term of this patent is extended or adjusted under 35 U.S.C. 154(b) by 268 days.

(21) Appl. No.: 18/034,288

(22) PCT Filed: Nov. 16, 2020

(86) PCT No.: PCT/JP2020/042637
§ 371 (c)(1),
(2) Date: Apr. 27, 2023

(87) PCT Pub. No.: WO2022/102134
PCT Pub. Date: May 19, 2022

(65) Prior Publication Data
US 2025/0016089 A1    Jan. 9, 2025

(51) Int. Cl.
*H04L 45/24* (2022.01)
*H04L 45/48* (2022.01)

(52) U.S. Cl.
CPC .................... *H04L 45/24* (2013.01)

(58) Field of Classification Search
CPC ....... H04L 45/24; H04L 45/12; H04L 45/123; H04L 45/124; H04L 45/02; H04L 45/16;
(Continued)

(56) References Cited

U.S. PATENT DOCUMENTS 6,678,524 B1    1/2004    Hansson et al.
6,914,972 B1    7/2005    Baumeister et al.
(Continued)

FOREIGN PATENT DOCUMENTS

EP    3041311 A1    7/2016
JP    H10117215 A    5/1998
(Continued)

OTHER PUBLICATIONS

Ramesh Govindan et al., An Architecture for Stable, Analyzable Internet Routing, IEEE Network, vol. 13, issue 1, pp. 29-35, 1999.
(Continued)

*Primary Examiner* — Mohamed A Kamara
(74) *Attorney, Agent, or Firm* — Harness, Dickey & Pierce, P.L.C.

(57) ABSTRACT

An aspect of the present invention is a communication path search device that constructs a multicast path of a plurality of nodes connected to a network, the communication path search device including a network device information management unit configured to manage a device specification including constraint information on the number of branches of each of the nodes on the network, a network topology management unit configured to manage link information between the nodes on the network, and a multicast tree calculation unit configured to construct a Steiner tree of a path connecting a start node and an end node based on a new request, an existing request, the constraint information on the number of branches of each of the nodes, constraint information on a maximum number of branches of each of the nodes, and the link information, the new request and the existing request each including start node and end node information.

8 Claims, 8 Drawing Sheets

(58) Field of Classification Search
CPC ...... H04L 45/48; H04L 41/12; H04J 14/0271; H04J 14/0238; H04J 14/0257
See application file for complete search history.

(56) References Cited

U.S. PATENT DOCUMENTS

| | | |
|---|---|---|
| 7,519,049 B2 | 4/2009 | Masuda |
| 7,822,065 B2 | 10/2010 | Lu |
| 8,719,534 B1 | 5/2014 | Ray, III et al. |
| 9,141,420 B2 | 9/2015 | Chang et al. |
| 9,146,769 B1 | 9/2015 | Shankar et al. |
| 9,780,909 B2 * | 10/2017 | Wood ................ H04J 14/0286 |
| 9,785,478 B1 | 10/2017 | Babu B R et al. |
| 10,904,136 B2 * | 1/2021 | Allan ...................... H04L 45/16 |
| 11,089,105 B1 | 8/2021 | Karumbunathan et al. |
| 11,301,407 B2 | 4/2022 | Sen et al. |
| 2001/0009031 A1 * | 7/2001 | Nitta .................. G06F 30/394 716/129 |
| 2003/0184651 A1 | 10/2003 | Ohsawa et al. |
| 2006/0171713 A1 | 8/2006 | Feng |
| 2007/0079307 A1 | 4/2007 | Dhawan et al. |
| 2008/0235361 A1 | 9/2008 | Crosbie et al. |
| 2009/0240790 A1 | 9/2009 | Utsunomiya et al. |
| 2010/0042636 A1 | 2/2010 | Lu |
| 2011/0126047 A1 | 5/2011 | Anderson et al. |
| 2012/0117563 A1 | 5/2012 | Chang et al. |
| 2012/0327953 A1 | 12/2012 | Vokkarane et al. |
| 2013/0262390 A1 | 10/2013 | Kumarasamy et al. |
| 2014/0019621 A1 | 1/2014 | Khan et al. |
| 2014/0181984 A1 | 6/2014 | Kundu et al. |
| 2014/0258533 A1 | 9/2014 | Antony |
| 2015/0363219 A1 | 12/2015 | Kasturi et al. |
| 2017/0235817 A1 | 8/2017 | Deodhar et al. |
| 2017/0317780 A1 * | 11/2017 | Wood ................ H04L 41/0896 |
| 2018/0191601 A1 | 7/2018 | Micallef |
| 2019/0042325 A1 | 2/2019 | Nair |
| 2019/0327144 A1 | 10/2019 | Tembey et al. |
| 2019/0339320 A1 | 11/2019 | Dzafic |
| 2020/0218684 A1 | 7/2020 | Sen et al. |
| 2020/0412657 A1 | 12/2020 | Jang et al. |
| 2022/0158756 A1 | 5/2022 | Wang et al. |

FOREIGN PATENT DOCUMENTS

| | | | |
|---|---|---|---|
| JP | 2003535526 A | 11/2003 | |
| JP | 2005064970 A | 3/2005 | |
| JP | 2006527541 A | 11/2006 | |
| JP | 2010521761 A | 6/2010 | |
| JP | 2012505561 A | 3/2012 | |
| JP | 2015065527 A | 4/2015 | |
| JP | 2015527649 A | 9/2015 | |
| KR | 1020140003200 A | 1/2014 | |
| WO | WO-0193607 A1 | 12/2001 | |
| WO | WO-2004111775 A2 | 12/2004 | |
| WO | WO-2010041582 A1 | 4/2010 | |
| WO | WO-2015029416 A1 | 3/2015 | |
| WO | WO-2020143380 A1 | 7/2020 | |

OTHER PUBLICATIONS

Yang Chen et al., Optical Burst Switching: A New Area in Optical Networking Research, IEEE Network, vol. 18, issue 3, pp. 16-23, 2004.

Aten International Co., Ltd. KE6920 datasheet, ver. 01, Jun. 17, 2020, 1-5, https://assets.aten.com/product/spec_sheet/JP/ke6920-6922_ver01j.pdf, ATEN Product Information KE6920.

Takamichi Nishijima et al., On the Impact of Network Environment on Remote Desktop Protocols, IEICE Technical Report CQ2012-21 (Jul. 2012), 2012, pp. 23-28.

Bijoy Chand Chatterjee et al., Routing and Wavelength Assignment for WDM-based Optical Networks, Springer, pp. 35-43, vol. 410, 2017.

Wei Lu et al., Dynamic Service Provisioning of Advance Reservation Requests in Elastic Optical Networks, Journal of Lightwave Technology, vol. 31, Issue. 10, 2013, pp. 1621-1627.

M. Jinno et al., An Overview of Elastic Optical Networks, Proceedings of the 2013 IEICE Communications Society Conference, 2013, p. SS-98-SS-99.

Pegah Afsharlar et al., Routing and Spectrum Assignment with Delayed Allocation in Elastic Optical Networks, Journal of Optical Communications and Networking, 2017, pp. 1-10.

K. Yamaguchi et al., MXN Wavelength Selective Switches Using Beam Splitting By Space Light Modulators, IEEE Photonics Journal, vol. 8, No. 1, Feb. 2016.

R. A. Wagner and S. E. Dreyfus, The Steiner Problem in Graphs, Networks 1, Dreyfus and Wagner, pp. 195-207, 1972.

Y. Liu et al., The Degree-Constrained Multicasting Algorithm Using Ant Algorithm, Proceedings of the 10th International Conference on Telecommunications, 2003, pp. 370-374.

Ryan Shea and Jiangchuan Liu, Cloud Gaming: Architecture and Performance, IEEE Network • Jul./Aug. 2013, IEEE 2013, pp. 16-21.

International Search Report issued in PCT/JP2020/036303, mailed on Feb. 2, 2021.

International Search Report issued in PCT/JP2020/039655, mailed on Feb. 16, 2021.

"Masahiko Jinno, ""Virtualization in Optical Networks from Network Level to Hardware Level [Invited]"", Oct. 2013, Optical Society of America (Year: 2013)".

* cited by examiner

COMMUNICATION PATH FINDING DEVICE, COMMUNICATION PATH FINDING METHOD, AND PROGRAM

CROSS-REFERENCE TO RELATED APPLICATIONS

This application is a 371 U.S. National Phase of International Application No. PCT/JP2020/042637, filed on Nov. 16, 2020. The entire disclosure of the above application is incorporated herein by reference.

TECHNICAL FIELD

The present invention relates to techniques of a communication path search device, a communication path search method, and a program.

BACKGROUND ART

With respect to a wavelength selective switch (WSS) that outputs any wavelength of an optical input signal to any path, a wavelength selective switch having a function of outputting optical signals having the same wavelength to a plurality of paths (transmission paths) has been devised in recent years (see, for example, Non Patent Literature 1). Using such a wavelength selective switch makes it possible to implement optical multicast in which a wavelength output from one node is branched at a relay node and distributed to a plurality of nodes.

In general, to construct a multicast path (tree), a Steiner tree, which is a minimum spanning tree constituted by a graph subset, is used. Although the construction of a Steiner tree is considered as an NP-hard problem, there is an algorithm that efficiently solves the problem (for example, see Non Patent Literature 1).

In general, the number of paths to which a WSS can output signals has an upper limit due to a constraint on the number of ports or the like.

CITATION LIST

Non Patent Literature

Non Patent Literature 1: K. Yamaguchi et al., "M×N Wavelength Selective Switches Using Beam Splitting By Space Light Modulators" IEEE Photonics Journal, vol. 8, no. 1, February 2016

Non Patent Literature 2: Dreyfus-Wagner algorithm, S. Dreyfus, R. Wagner, "The Steiner problem in graphs", Networks 1, pp. 195-207, 1972

SUMMARY OF INVENTION

Technical Problem

However, there is a problem that it is not possible to construct a Steiner tree satisfying a constraint.

In view of the above circumstances, an object of the present invention is to provide a technique capable of constructing a Steiner tree satisfying a constraint.

Solution to Problem

An aspect of the present invention is a communication path search device that constructs a multicast path of a plurality of nodes connected to a network, the communication path search device including a network device information management unit configured to manage a device specification including constraint information on a maximum number of branches of each of the nodes on the network, a network topology management unit configured to manage link information between the nodes on the network, and a multicast tree calculation unit configured to construct a Steiner tree of a path connecting a start node and an end node based on a new request, an existing request, the constraint information on the number of branches of each of the nodes, and the link information, the new request and the existing request each including start node and end node information.

An aspect of the present invention is a communication path search device that constructs a multicast path of a plurality of nodes connected to a network, the communication path search device including a network device information management unit configured to manage a device specification including constraint information on a maximum number of branches of each of the nodes on the network, a network topology management unit configured to manage link information between the nodes on the network, and a multicast tree calculation unit configured to construct a Steiner tree of a path connecting a start node and an end node based on a plurality of requests, the constraint information on the number of branches of each of the nodes, and the link information, the plurality of requests each including start node and end node information.

An aspect of the present invention is a communication path search method for constructing a multicast path of a plurality of nodes connected to a network, the communication path search method including constructing, by a multicast tree calculation unit, a Steiner tree of a path connecting a start node and an end node based on a new request, an existing request, constraint information on a maximum number of branches of each of the nodes on the network, and link information between the nodes on the network, the new request and the existing request each including start node and end node information.

An aspect of the present invention is a communication path search method for constructing a multicast path of a plurality of nodes connected to a network, the communication path search method including constructing, by a multicast tree calculation unit, a Steiner tree of a path connecting a start node and an end node based on a plurality of requests, constraint information on a maximum number of branches of each of the nodes on the network, and link information between the nodes on the network, the plurality of requests each including start node and end node information.

An aspect of the present invention is a program for causing a computer to construct a Steiner tree of a path connecting a start node and an end node based on a new request, an existing request, constraint information on a maximum number of branches of each of nodes on a network, and link information between the nodes on the network, the new request and the existing request each including start node and end node information.

An aspect of the present invention is a program for causing a computer to construct a Steiner tree of a path connecting a start node and an end node based on a plurality of requests, constraint information on a maximum number of branches of each of nodes on a network, and link information between the nodes on the network, the plurality of requests each including start node and end node information.

Advantageous Effects of Invention

According to the present invention, it is possible to construct a Steiner tree satisfying a constraint.

DESCRIPTION OF EMBODIMENTS

Embodiments of the present invention will be described in detail with reference to the drawings.

Figure 1:
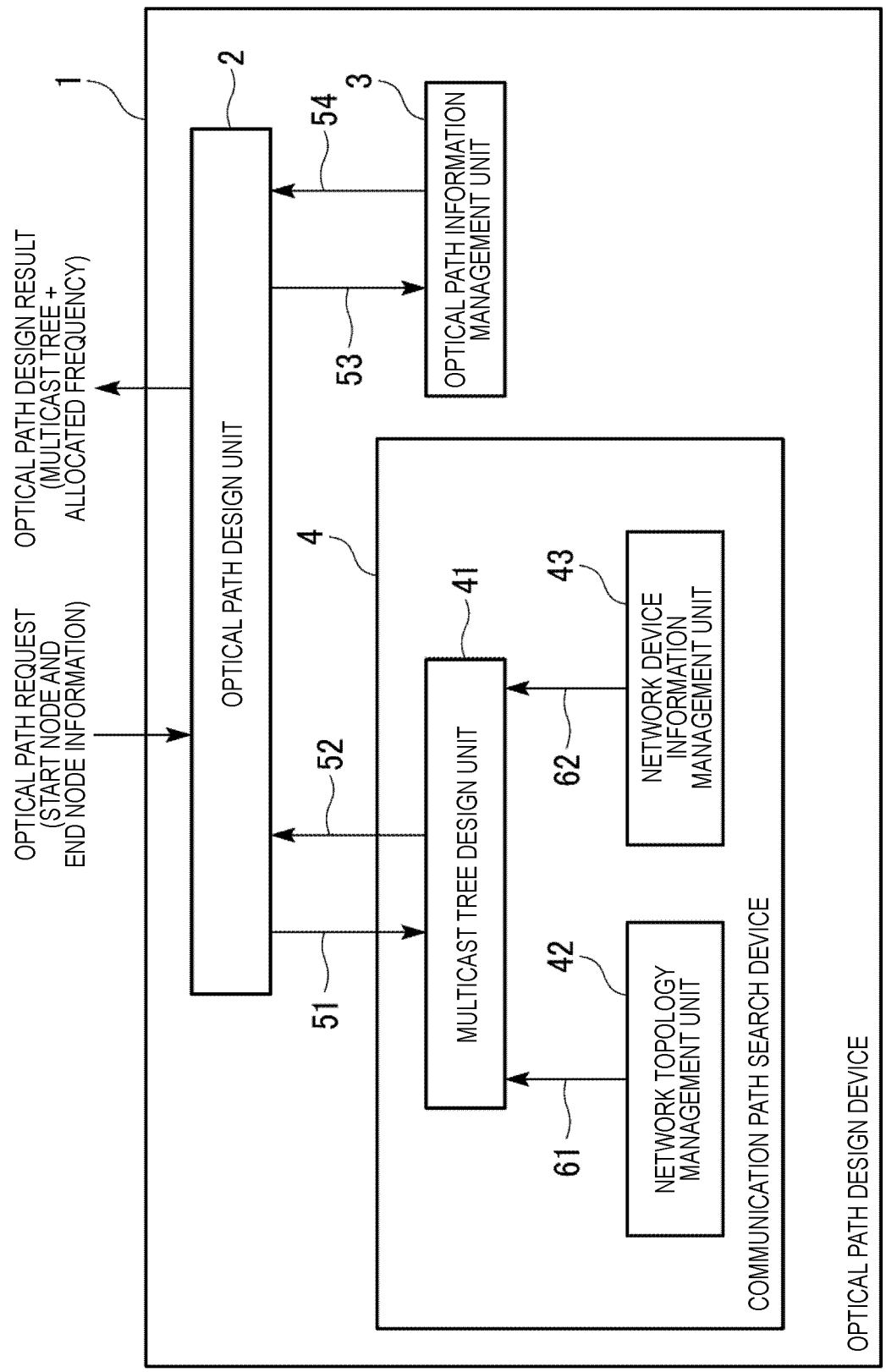
FIG. 1 is a diagram illustrating a configuration example of an optical path design device including a communication path search device according to an embodiment.

FIG. 1 is a diagram illustrating a configuration example of an optical path design device including a communication path search device according to an embodiment. As illustrated in FIG. 1, an optical path design device 1 includes an optical path design unit 2, an optical path information management unit 3, and a communication path search device 4.

Furthermore, the communication path search device 4 includes a multicast tree design unit 41, a network topology management unit 42, and a network device information management unit 43.

The optical path design device 1 has, for example, one function of a device that manages and operates an optical network. In this case, the optical path design device 1 designs an optical path design result (a multicast tree and an allocated frequency) based on an optical path request (hereinafter, also referred to as a "request") including start node and end node information that has arrived at (or manually input to) the optical network management operation device.

The optical path design unit 2 designs the optical path design result based on the acquired optical path request, frequency information 54 on a multicast tree managed by the optical path information management unit 3, and multicast tree information 52 output by the multicast tree design unit 41.

The optical path information management unit 3 manages the frequency information 54 on the multicast tree. Note that the optical path information management unit 3 outputs, to the optical path design unit 2, the frequency information 54 on a multicast tree 53 output by the optical path design unit 2.

The communication path search device 4 constructs the multicast tree from start node and end node information 51 input from the optical path design unit 2, and outputs the multicast tree information 52 related to the constructed multicast tree to the optical path design unit 2.

The multicast tree design unit 41 constructs the multicast tree based on the start node and end node information 51 input from the optical path design unit 2, network topology 61 managed by the network topology management unit 42, and device constraint information 62 managed by the network device information management unit 43. The multicast tree design unit 41 outputs the multicast tree information 52 to the optical path design unit 2. Note that the network topology 61 is connection-mode information between devices on a communication network.

The network topology management unit 42 manages link information between nodes on the network. The link information includes distance information of each link (fiber), which is the network topology 61.

The network device information management unit 43 manages a device specification of each node on the network. The device specification of each node includes information on the maximum number of branches, which is the device constraint information 62. Note that the information on the maximum number of branches will be described later.

The communication path search device 4 includes a processor such as a central processing unit (CPU) and a memory. The communication path search device 4 functions as the multicast tree design unit 41, the network topology management unit 42, and the network device information management unit 43 by the processor executing a program. Note that all or some of the functions of the communication path search device 4 may be implemented by use of hardware such as an application specific integrated circuit (ASIC), a programmable logic device (PLD), or a field programmable gate array (FPGA). The program may be recorded in a computer-readable recording medium. Examples of the computer-readable recording medium include a portable medium such as a flexible disk, a magneto-optical disk, a ROM, a CD-ROM, or a semiconductor storage device (for example, a solid state drive (SSD)), and a storage device such as a hard disk or a semiconductor storage device built in a computer system. The program may be transmitted via an electric communication line.

Next, a method of counting the number of branches of a communication node will be described.

Figure 2:
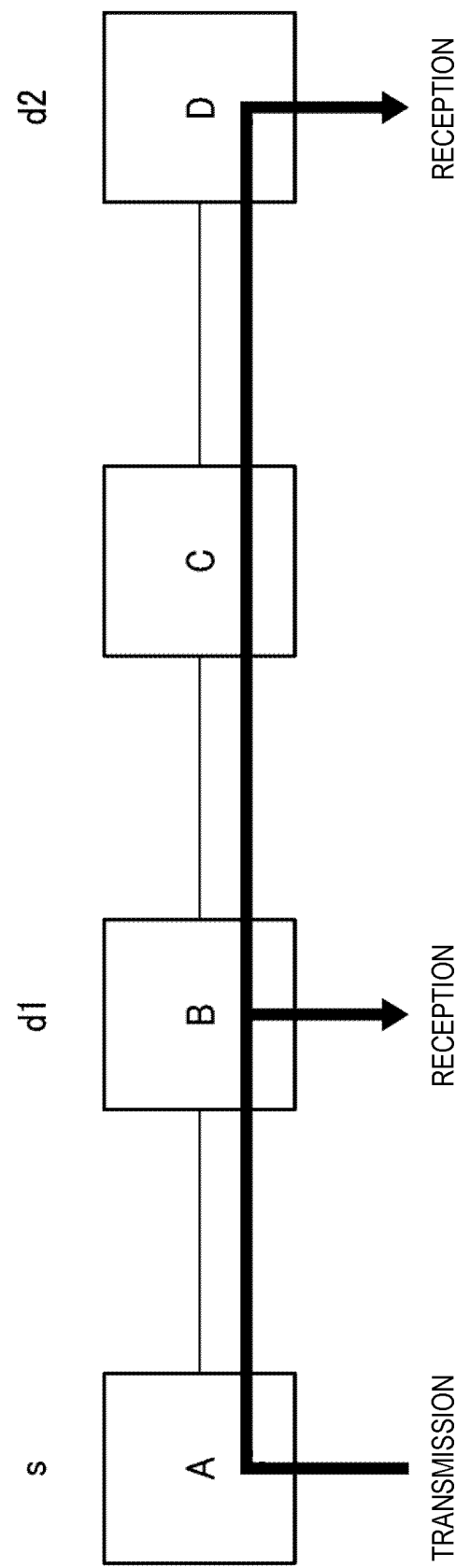
FIG. 2 is a diagram for describing a method of counting the number of branches of a communication node according to the embodiment.

FIG. 2 is a diagram for describing the method of counting the number of branches of a communication node according to the embodiment. The example of FIG. 2 is an example of a tree constructed by the multicast tree design unit 41, and nodes are connected in the order of A, B, C, and D. In FIG. 2, the node A is a start point s, the node B is a first end point d1, and the node D is a second end point d2. Note that each node includes, for example, a wavelength selective switch (WSS).

In the example of FIG. 2, data is transmitted from the start point s to the first end point d1 and the second end point d2.

The node B distributes the data transmitted from the node A to the node B itself and the node D. Therefore, the number of branches of the node B is two.

First Embodiment

In the present embodiment, in a case where requests arrive sequentially, a multicast tree is searched for.

First, the case where requests arrive sequentially will be described with reference to FIGS. 3 to 6. Note that, as a device constraint, the maximum number of branches per node is two. Note that the maximum number of branches as a device constraint is, for example, a constraint on the number of branches of a WSS. In FIGS. 3 to 6, circles indicate communication nodes (hereinafter also referred to as "nodes"), and lines indicate links.

Figure 3:
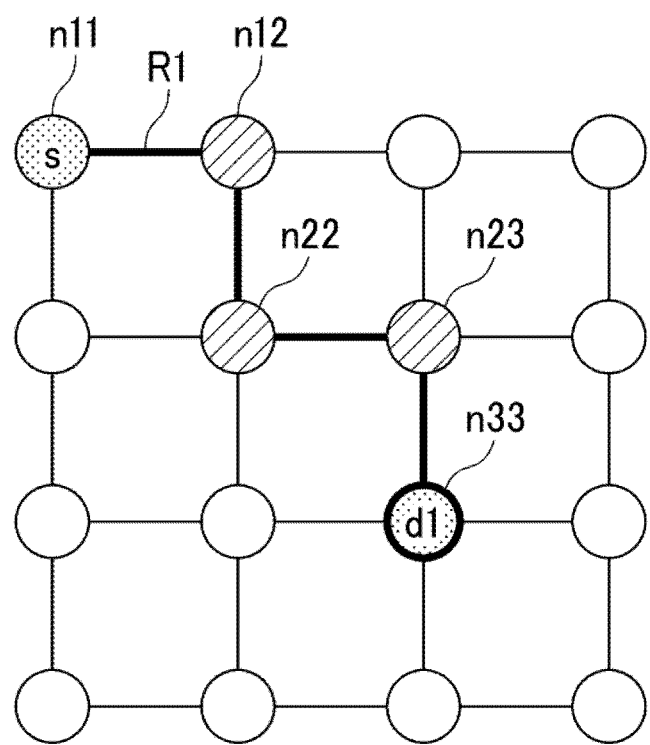
FIG. 3 is a diagram illustrating a first operation state in a case where requests arrive sequentially according to a first embodiment.

FIG. 3 is a diagram illustrating a first operation state in the case where requests arrive sequentially according to the present embodiment. In FIG. 3, a node n11 is the start point s and a node n33 is the first end point d1. As illustrated in FIG. 3, the multicast tree design unit 41 searches for a path connecting the start point and the end point by the shortest path. As a result, the multicast tree design unit 41 searches for a first path R1 in the order of the node n11 to a node n12, the node n12 to a node n22, the node n22 to a node n23, and the node n23 to the node n33 as illustrated in FIG. 3.

Figure 4:
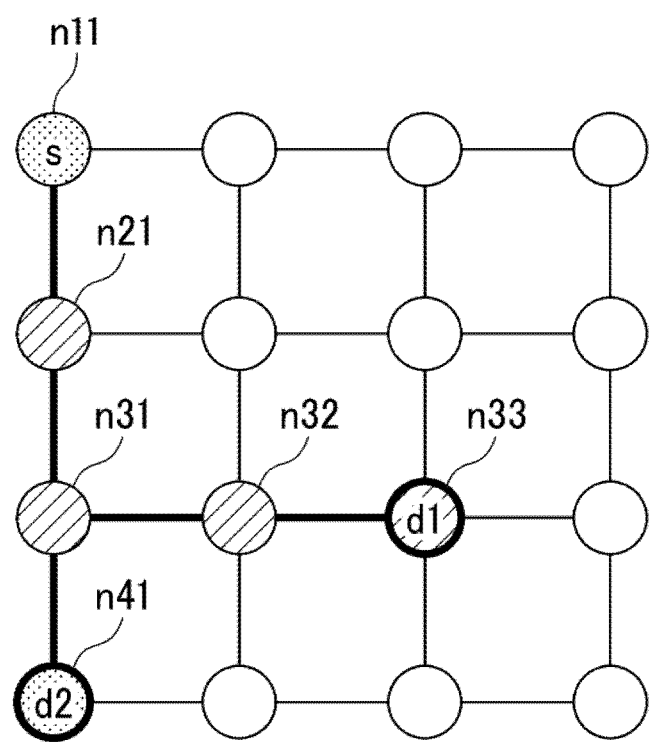
FIG. 4 is a diagram illustrating a second operation state in the case where requests arrive sequentially according to the first embodiment.

FIG. 4 is a diagram illustrating a second operation state in the case where requests arrive sequentially according to the present embodiment. The state of FIG. 4 is an operating state when the multicast tree design unit 41 acquires a request for setting the second end point d2 to a node n41 in the state of FIG. 3. In this case, the multicast tree design unit 41 newly constructs a Steiner tree so as to minimize a plurality of paths based on the existing start and end points and the newly acquired start and end points. In this case, a node 31 is a branch point, and the number of branches is two. In this state, the node n31 distributes the data transmitted from the node n11 to a node n32 and the node n41. The multicast tree design unit 41 searches for a second path and a third path. The second path is a path in the order of the node n11 to a node n21, the node n21 to the node n31, the node n31 to the node n32, and the node n32 to the node n33. The third path is a path in the order of the node n11 to the node n21, the node n21 to the node n31, and the node n31 to the node n41.

Figure 5:
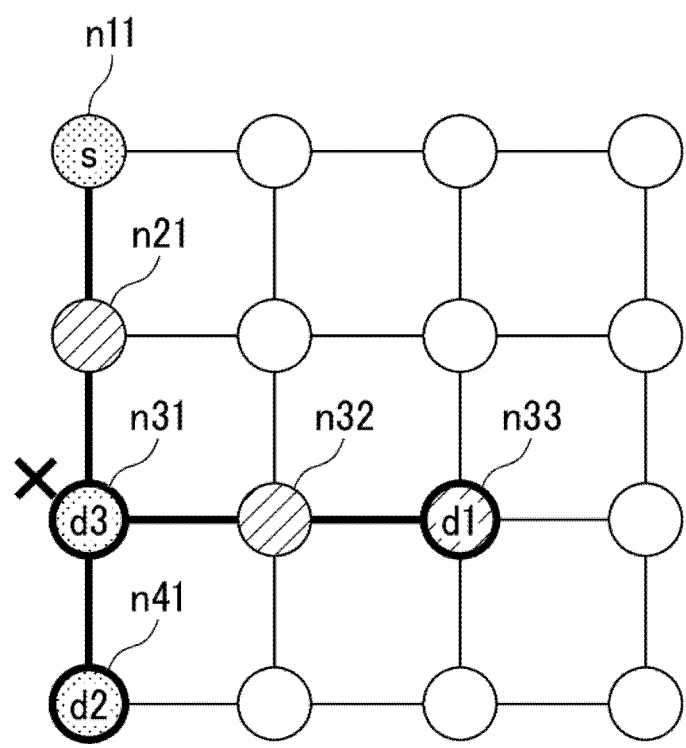
FIG. 5 is a diagram illustrating a third operation state in the case where requests arrive sequentially according to the first embodiment.

FIG. 5 is a diagram illustrating a third operation state in the case where requests arrive sequentially according to the present embodiment. The state of FIG. 5 is an operating state when the multicast tree design unit 41 acquires a request for setting a third end point d3 to the node n31 in the state of FIG. 4. Furthermore, the state of FIG. 5 is a state in which a node exceeding the maximum number of branches is generated. Note that the multicast tree design unit 41 checks the number of branches each time a tree is constructed. In this state, the node n31 distributes the data transmitted from the node n11 to the node n31 itself, the node n32, and the node n41. Therefore, the number of branches of the node n31 is three. This case does not satisfy the constraint that the maximum number of branches per node is two.

Figure 6:
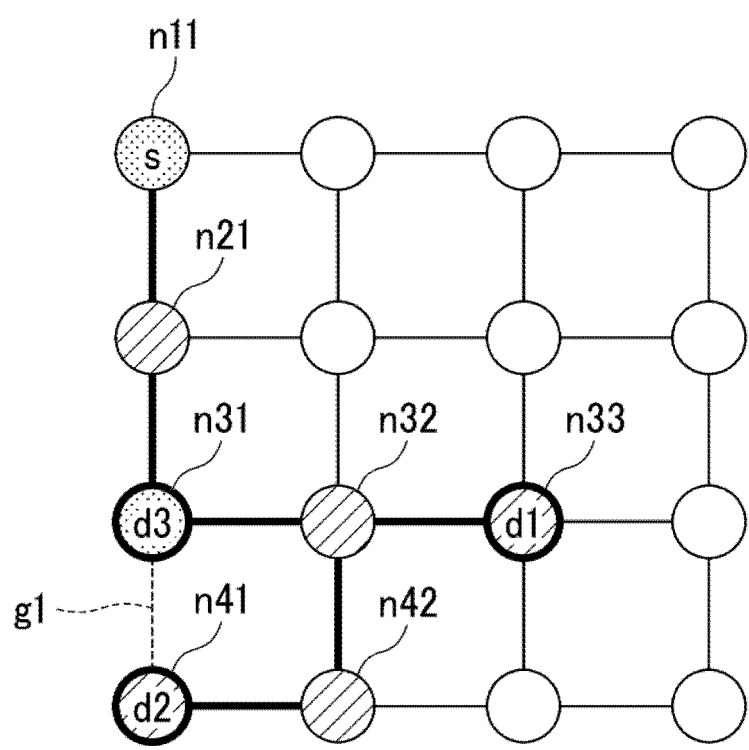
FIG. 6 is a diagram illustrating a fourth operation state in the case where requests arrive sequentially according to the first embodiment.

FIG. 6 is a diagram illustrating a fourth operation state in the case where requests arrive sequentially according to the present embodiment. The state of FIG. 6 is a state in which a Steiner tree is constructed again from the state of FIG. 5 so as to satisfy the conditions. As illustrated in FIG. 6, the multicast tree design unit 41 increases a link cost between the node n31 (third end point) exceeding the maximum number of branches and the second end point d2 (node n41), which is the closest to the node n31, so as not to cause branching (broken line g1), and constructs a Steiner tree again. As a result, the path to the end point d2 becomes a path in the order of the node n11 to the node n21, the node n21 to the node n31, the node n31 to the node n32, the node n32 to a node n42, and the node n42 to the node n41.

The multicast tree design unit 41 newly constructs a Steiner tree based on existing start and end points and newly arrived start and end points in a case where there is a new request, and ends the processing in a case where there is no new request.

Note that, in FIGS. 3 to 6, the example has been described in which the maximum number of branches per node is two, but the maximum number of branches may be three or more depending on the application.

Here, the link cost will be described.

As a link cost, for example, a link distance (fiber length) held in the network topology management unit is used. In a case where a penalty for increasing a link cost is imposed, the multicast tree design unit 41 sets a sufficiently larger value than the link cost (for example, in a case where the maximum value of a link distance is 100, the cost is multiplied by 100).

Here, data of a Steiner tree constructed at the time of searching for a multicast tree will be described. The data of the Steiner tree is defined by a set of links (or nodes) through which the data passes. The path search process is closed in the communication path search device 4, and communication with an actual node does not occur. The communication path search device 4 performs setting for each device when actually setting the optical multicast tree based on a search result.

Note that multicast is design of a path from one start point to a plurality of end points. Therefore, multicast does not necessarily design the shortest path. Furthermore, the subject that designs and manages a path is not a node such as a transmitter or a receiver but a remote device (the communication path search device 4, the optical path design device 1, or the like).

In addition, the maximum number of branches per node is determined by a device specification of a wavelength selective switch. For example, each node using the same wavelength selective switch has the same maximum number of branches. Note that the information on the maximum number of branches is held by the network device information management unit 43. The calculation of a link cost is determined by, for example, the distance of a link (fiber). The distance information of each link is held by the network topology management unit 42. Note that the management means is an example, may be any means, and may be, for example, a database or a text file.

Next, a processing procedure example will be described.

Figure 7:
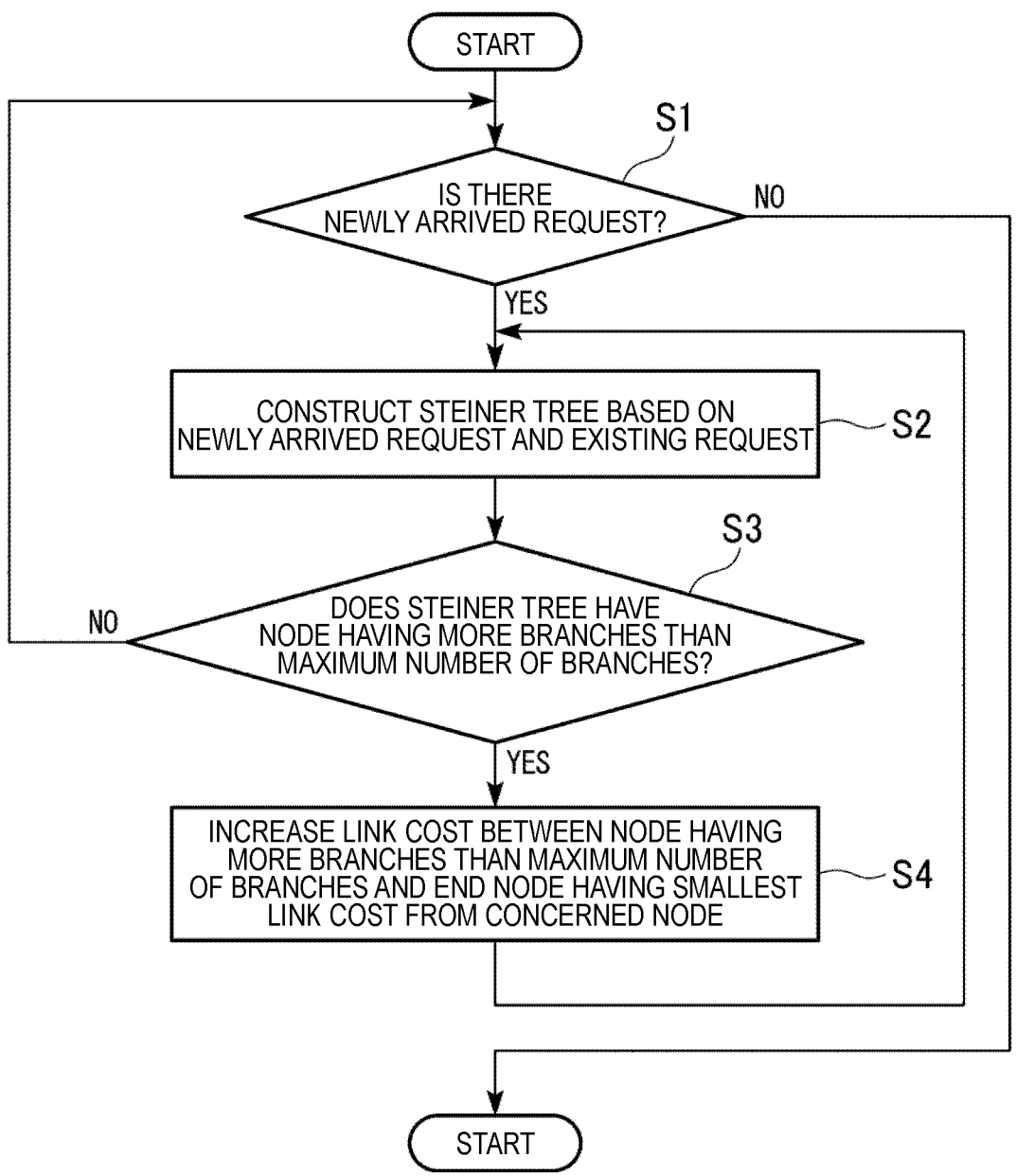
FIG. 7 is a flowchart of a processing procedure in the case where requests sequentially arrive according to the first embodiment.

FIG. 7 is a flowchart of the processing procedure in the case where requests arrive sequentially according to the present embodiment.

The multicast tree design unit 41 determines whether there is a newly arrived request (step S1). In a case where there is a newly arrived request (step S1; YES), the multicast tree design unit 41 advances the processing to step S2. In a case where there is no newly arrived request (step S1; NO), the multicast tree design unit 41 ends the processing.

The multicast tree design unit 41 constructs a Steiner tree based on the newly arrived request and an existing request (step S2).

The multicast tree design unit 41 determines whether the Steiner tree has a node having more branches than the maximum number of branches (step S3). In a case where the Steiner tree has a node having more branches than the maximum number of branches (step S3; YES), the multicast tree design unit 41 advances the processing to step S4. In a case where the Steiner tree has no node having more branches than the maximum number of branches (step S3; NO), the multicast tree design unit 41 returns the processing to step S1.

The multicast tree design unit 41 increases a link cost between the node having more branches than the maximum number of branches and an end node having the smallest link cost from the concerned node (step S4). After the processing, the multicast tree design unit 41 returns the processing to step S2.

In the present embodiment, a Steiner tree is reconstructed each time a request is acquired, and a link is changed based on a link cost in a case where each node in the reconstructed Steiner tree has more branches than the maximum number of branches.

As a result, according to the present embodiment, in a case where a link does not satisfy the constraint on the number of branches, the weight of the link is changed, and thus it is possible to construct a Steiner tree that satisfies the constraint (for example, the maximum number of branches of a wavelength selective switch (WSS)).

Second Embodiment

In the present embodiment, a plurality of requests is collectively processed to search for a multicast tree.

Figure 8:
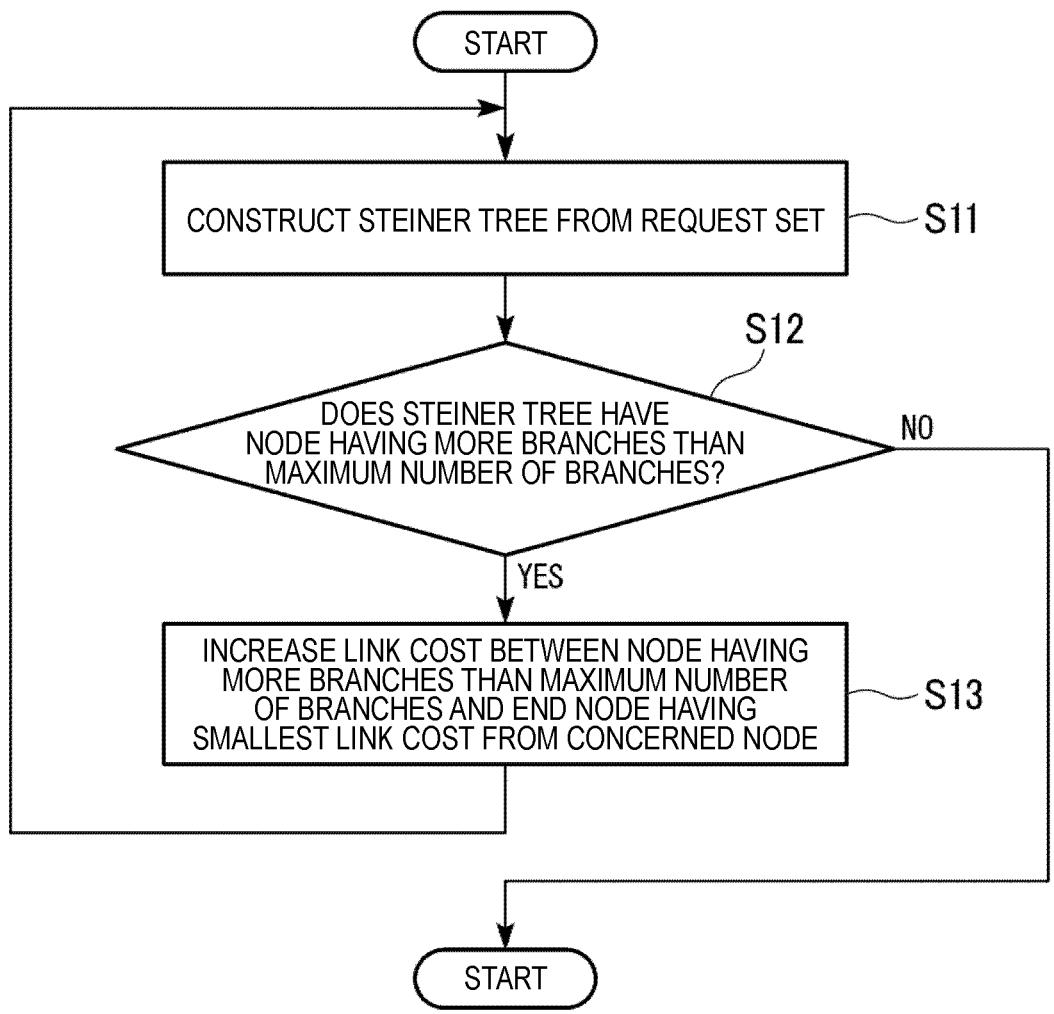
FIG. 8 is a flowchart of a processing procedure in a case where a plurality of requests is collectively processed according to a second embodiment.

FIG. 8 is a flowchart of a processing procedure in the case where a plurality of requests is collectively processed according to the present embodiment.

The multicast tree design unit 41 constructs a Steiner tree from a request set (step S11).

The multicast tree design unit 41 determines whether the Steiner tree has a node having more branches than the maximum number of branches (step S12). In a case where the Steiner tree has a node having more branches than the maximum number of branches (step S12; YES), the multicast tree design unit 41 advances the processing to step S13. In a case where the Steiner tree has no node having more branches than the maximum number of branches (step S12; NO), the multicast tree design unit 41 ends the processing.

The multicast tree design unit 41 increases a link cost between the node having more branches than the maximum number of branches and an end node having the smallest link cost from the concerned node (step S13). After the processing, the multicast tree design unit 41 returns the processing to step S11.

In the present embodiment, a Steiner tree is constructed based on all the requests, and a link is changed based on a link cost in a case where each node in the constructed Steiner tree has more branches than the maximum number of branches.

According to the present embodiment, in a case where a link does not satisfy the constraint on the number of branches, the weight of the link is changed, and thus it is possible to construct a Steiner tree that satisfies the constraint (for example, the maximum number of branches of a wavelength selective switch (WSS)).

Here, an example of a conventional procedure for constructing a multicast path will be described.

In conventional multicast, one transmitting node and one or more receiving nodes are connected in a form of a tree structure at 1:N on a network. A Steiner tree indicates a minimum tree constituted by a subset including a transmitting node and receiving nodes in a network (graph). There is a plurality of algorithms for constructing a Steiner tree, and the algorithms include a method of constructing a Steiner tree by sequentially combining the calculated shortest paths from the transmitting node to the receiving nodes and a method of constructing a Steiner tree by replacing a spanning tree as a known algorithm with the shortest paths between the transmitting node and the receiving nodes.

In the conventional construction method, in a case where the number of branches is not checked, a part of a multicast tree that is well designed in design cannot be branched, or the power of optical signals decrease with an increase in the number of branches, so that an optical signal whose received power is less than a reference value cannot be normally restored.

On the other hand, according to each of the above-described embodiments, in a case where a link does not satisfy the constraint on the number of branches, the weight of the link is changed, so that a Steiner tree that satisfies the constraint can be constructed.

In each of the above-described embodiments, an example has been described in which the network is an optical network, but the network is not limited to the optical network and may be another network.

Furthermore, in each of the above-described embodiments, an example has been described in which the maximum number of branches is determined in advance, but the present invention is not limited thereto. The communication path search device 4 may acquire, for example, constraint information such as the maximum number of branches together with a request.

Furthermore, in each of the above-described embodiments, an example has been described in which the device constraint is the maximum number of branches of a node, but the present invention is not limited thereto.

Although the embodiments of the present invention have been described in detail with reference to the drawings, specific configurations are not limited to the embodiments, and include design and the like within a range without departing from the gist of the present invention.

INDUSTRIAL APPLICABILITY

The present invention is applicable to construction of a network such as an optical network in a case where a request or the like is made to a node.

REFERENCE SIGNS LIST

1 Optical path design device
2 Optical path design unit
3 Optical path information management unit
4 Communication path search device
41 Multicast tree design unit
42 Network topology management unit
43 Network device information management unit

The invention claimed is:

1. A communication path search device that constructs a multicast path of a plurality of nodes connected to a network, the communication path search device comprising:
   a network device information management unit configured to manage a device specification including constraint information on a maximum number of branches of each of the nodes on the network;
   a network topology management unit configured to manage link information between the nodes on the network; and
   a multicast tree calculation unit configured to construct a Steiner tree of a path connecting a start node and an end node based on a new request, an existing request, the constraint information on the number of branches of each of the nodes, and the link information, the new request and the existing request each including start node and end node information.

2. A communication path search device that constructs a multicast path of a plurality of nodes connected to a network, the communication path search device comprising:

a network device information management unit configured to manage a device specification including constraint information on a maximum number of branches of each of the nodes on the network;

a network topology management unit configured to manage link information between the nodes on the network; and a multicast tree calculation unit configured to construct a Steiner tree of a path connecting a start node and an end node based on a plurality of requests, the constraint information on the number of branches of each of the nodes, and the link information, the plurality of requests each including start node and end node information.

3. The communication path search device according to claim 1, wherein, in a case where the number of branches of each of the nodes in the constructed Steiner tree is larger than the maximum number of branches, the multicast tree calculation unit reconstructs the Steiner tree to increase a link cost between a node having more branches than the maximum number of branches and a node having a smallest link cost from the node.

4. The communication path search device according to claim 2, wherein, in a case where the number of branches of each of the nodes in the constructed Steiner tree is larger than the maximum number of branches, the multicast tree calculation unit reconstructs the Steiner tree to increase a link cost between a node having more branches than the maximum number of branches and a node having a smallest link cost from the node.

5. A communication path search method for constructing a multicast path of a plurality of nodes connected to a network, the communication path search method comprising constructing, by a multicast tree calculation unit, a Steiner tree of a path connecting a start node and an end node based on a new request, an existing request, constraint information on a maximum number of branches of each of the nodes on the network, and link information between the nodes on the network, the new request and the existing request each including start node and end node information.

6. A communication path search method for constructing a multicast path of a plurality of nodes connected to a network, the communication path search method comprising constructing, by a multicast tree calculation unit, a Steiner tree of a path connecting a start node and an end node based on a plurality of requests, constraint information on a maximum number of branches of each of the nodes on the network, and link information between the nodes on the network, the plurality of requests each including start node and end node information.

7. A non-transitory computer readable storage medium storing a program for causing a computer to construct a Steiner tree of a path connecting a start node and an end node based on a new request, an existing request, constraint information on a maximum number of branches of each of nodes on a network, and link information between the nodes on the network, the new request and the existing request each including start node and end node information.

8. A non-transitory computer readable storage medium storing a program for causing a computer to construct a Steiner tree of a path connecting a start node and an end node based on a plurality of requests, constraint information on a maximum number of branches of each of nodes on a network, and link information between the nodes on the network, the plurality of requests each including start node and end node information.

\* \* \* \* \*